Nov. 7, 1933. W. C. ASBURY 1,934,029
PROCESS FOR TREATING GASEOUS MIXTURES
Filed Oct. 23, 1928
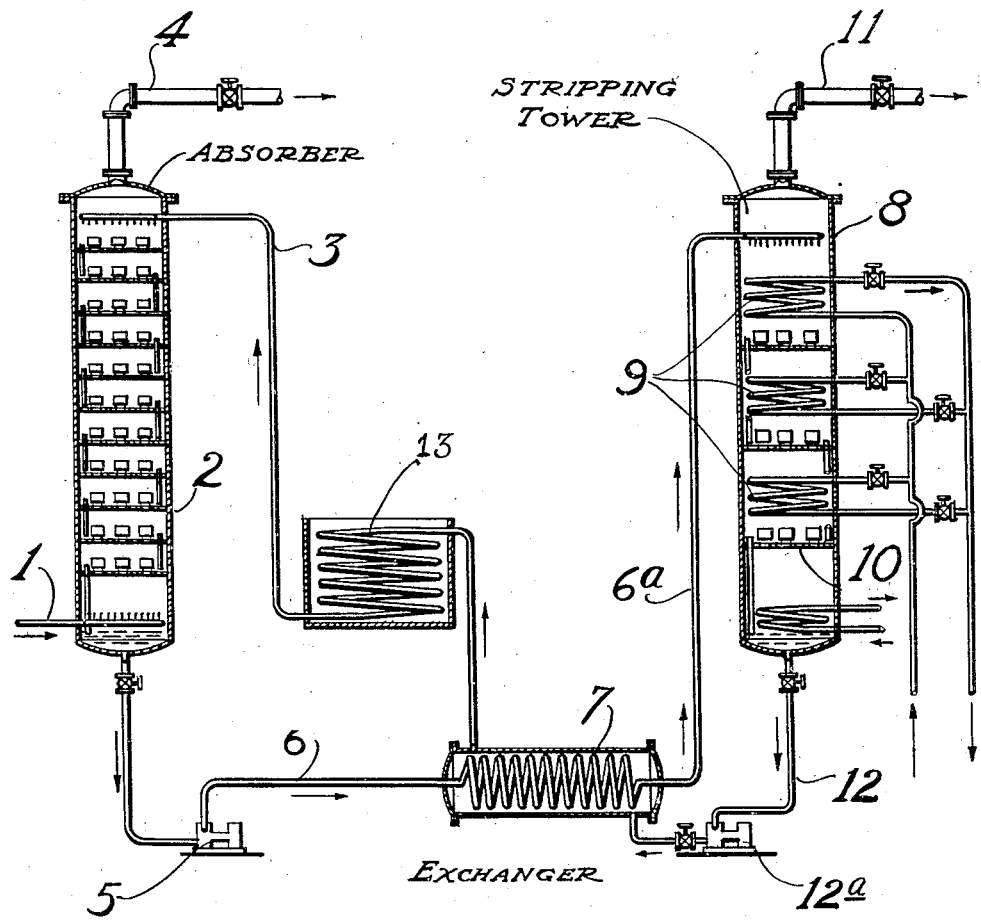
WILLARD C. ASBURY, Inventor

Patented Nov. 7, 1933

1,934,029

UNITED STATES PATENT OFFICE 1,934,029

PROCESS FOR TREATING GASEOUS MIXTURES

Willard C. Asbury, Baton Rouge, La., assignor to Standard Oil Development Company, a corporation of Delaware Application October 23, 1928. Serial No. 314,510

6 Claims. (Cl. 23—210)

The present invention relates to the art of separating gaseous mixtures and more specifically comprises an improved process for obtaining a gas rich in hydrogen from its mixtures with other gases, such as hydrocarbon gases. My process will be fully understood from the following description and the drawing which illustrates my process.

The drawing is a sectional elevation in semi-diagrammatic form of an apparatus suitable for my process.

Referring to the drawing, reference character 1 denotes a pipe for conducting a gaseous mixture containing hydrogen with other gases, such as hydrocarbon gas, to an absorption tower 2. The tower may be constructed according to any preferred design for bringing the gas in contact with the solvent which is admitted by pipe 3. A pipe 4 is provided at the top of tower 2 for the removal of unabsorbed gas, which may be conducted to storage (not shown) or to any point where it is desired.

The saturated solvent, which is preferably a hydrocarbon oil when it is desired to separate hydrogen and hydrocarbon gas, is withdrawn from the base of tower 2 and is forced by pump 5 through line 6 to a heat exchanger 7 and then by line 6a to the top of a stripping column 8. The column is preferably a bell cap plate tower fitted with heating coils 9 on the plates 10. The gas evolved under the influence of heat is removed by line 11 to serve as fuel or for other purposes, while the solvent is withdrawn from the base of column 8 by line 12. Pump 12a forces the solvent through exchanger 7 and cooler 13 and by line 3 back to the top of tower 2.

In the operation of my process, the gas mixture, for example, hydrogen and hydrocarbon gas is scrubbed under pressure in substantial excess of atmospheric pressure and preferably at a pressure above 1000 pounds per square inch with a solvent such as hydrocarbon oil in which the hydrocarbon gas is soluble to a considerable extent and which has a positive temperature coefficient of solubility in respect to hydrogen and a negative coefficient in respect to the other gas or gases of the mixture.

The rich solvent is then withdrawn, preheated and discharged into the column 8 where a part of the gas, largely hydrocarbon, is removed by the influence of heat, but at the same or substantially the same pressure that prevailed during absorption. There is no substantial loss of hydrogen, as will be understood.

I have found that lower boiling oils are more satisfactory as solvents in the separation of hydrogen and hydrocarbons than higher boiling oils, and although gas oil and higher boiling oils may be used, I prefer a heavy naphtha, such, for instance, that boils substantially between 300 and 500° F. and is free of volatile light ends.

The temperature in the stripping column depends on the prevailing pressure, the higher the temperature, the more efficient will be the removal of the hydrocarbon gas but the temperature should be below that at which appreciable vaporization of the oil occurs under the prevailing pressure.

As an example of my process, it is found that under pressure of 2000 pounds per square inch and at 25° C. about 60 volumes of methane are dissolved per volume of gas oil, while at 300° C., under the same pressure, only 40 volumes can be dissolved. The volume of gas is measured at 25° F. and at atmospheric pressure. On the other hand, under equal pressure about 8.5 volumes of hydrogen dissolve in 1 of the oil at 25° F., and at 300° C. about 21 volumes are found to dissolve.

Although my process has been described particularly for the separation of hydrogen and gaseous hydrocarbons, it may be used to separate other mixtures containing hydrogen, and the use of solvents other than hydrocarbon oil is also contemplated. For example, ethyl ether, acetic acid and amyl alcohol may be used to separate hydrogen and nitrogen by my process. Benzene and nitro-benzene are satisfactory with mixtures of hydrogen and sulphur dioxide; alcohols with mixtures of hydrogen and ammonia, carbon monoxid and hydrogen and for mixtures of hydrogen and gaseous hydrocarbons, although for the latter, the use of hydrocarbon oil is preferable.

In general, organic or non-aqueous liquids appear to dissolve hydrogen to a greater extent at high than at low temperatures, but the solvent must be chosen for the particular gas mixture since positive temperature coefficients of solubility of gases such as nitrogen and carbon monoxid have been noted and in many cases the solubility is only slightly decreased by rise in temperature. Mixtures of gases other than hydrogen may be separated according to my method, as will be understood.

My invention is not to be limited by any theory of the mechanism of the process nor by any examples given merely by way of illustration, but only by the claims in which I wish to claim all novelty inherent in the invention.

I claim:

1. An improved process for obtaining a gas rich in free hydrogen from a mixture comprising hydrogen and another gas, without substantial loss of hydrogen, which comprises the steps of scrubbing the gas under pressure in excess of atmospheric with a non-aquous liquid solvent in which hydrogen has a positive temperature coefficient of solubility and in which the other gas has a negative coefficient, withdrawing the solvent and separately removing part of the dissolved gas by heat while maintaining substantially the same pressure under which solution occurred, cooling and returning the solvent to the absorption step.

2. Process according to claim 1, in which part of the dissolved gas is removed by heating the solvent to a temperature somewhat below that at which appreciable vaporization of the solvent occurs at the pressure prevailing.

3. An improved process for separating gas mixtures comprising the steps of scrubbing the mixture with a suitable liquid solvent in which the temperature coefficient of solubility of one component of the mixture is positive and the coefficient of another component thereof is negative, withdrawing and heating the solvent while maintaining pressure thereon substantially equal to that under which solution occurred, whereby a substantial portion of the last named component is evolved from the solvent without substantial loss of the first named component, separately withdrawing said evolved gas, cooling and returning the solvent to the scrubbing step.

4. Process of separating hydrogen from gaseous mixtures containing hydrogen and hydrocarbon gases which comprises scrubbing the gaseous mixture at normal temperature under pressure in excess of 1000 pounds per square inch with a hydrocarbon oil having a positive temperature coefficient of solubility for hydrogen and a negative coefficient of solubility for hydrocarbon gases, removing the unabsorbed gas consisting principally of hydrogen, heating the hydrocarbon oil containing absorbed gases under substantially the same pressure as that used in the scrubbing, removing gases evolved thereby, cooling the stripped oil and returning it to the scrubbing step.

5. Process according to claim 4 in which naphtha is used as the solvent.

6. Process according to claim 1, in which the solvent is cooled and returned to the absorption step without substantial reduction in pressure.

WILLARD C. ASBURY.